United States Patent

Campbell et al.

[11] Patent Number: 5,013,188
[45] Date of Patent: May 7, 1991

[54] PROCESS FOR REPLACING A LENGTH OF BURIED PIPE

[76] Inventors: David B. Campbell, 43 Glenmeadow Crescent, St. Albert, Alberta, Canada, T8N 3A2; Donald N. Campbell, 22 Ivy Crescent, Sherwood Park, Alberta, Canada

[21] Appl. No.: 509,757

[22] Filed: Apr. 17, 1990

[51] Int. Cl.$^5$ ............................................. F16L 1/00
[52] U.S. Cl. ................................... 405/184; 405/154
[58] Field of Search ............. 405/184, 161, 174, 154, 405/138; 37/193

[56] References Cited

U.S. PATENT DOCUMENTS

| | | | |
|---|---|---|---|
| 4,507,019 | 3/1985 | Thompson | 405/184 X |
| 4,626,134 | 12/1986 | Cuomont | 405/184 |
| 4,732,222 | 3/1988 | Schmidt | 405/184 X |
| 4,830,539 | 5/1989 | Akesaka | 405/184 |
| 4,874,268 | 10/1989 | Akesaka | 405/184 |
| 4,925,344 | 5/1990 | Peres | 405/184 |

Primary Examiner—Dennis L. Taylor
Assistant Examiner—J. Russell McBee
Attorney, Agent, or Firm—E. P. Johnson

[57] ABSTRACT

The process comprises excavating pits at the first and second ends of a buried section of old water main pipe that is to be replaced with new pipe. The exposed segments of pipe are broken up to provide access to the bore of the old pipe. A pipe splitter and a cylinder-actuated pulling unit are installed in the first pit. A string of rods is extended through the old pipe bore from the first pit to the second pit. A tool assembly of sequentially connected components is attached to the second end of the rod string. The tool assembly may comprise: means for centralizing the second end of the rod string in the second end of the old pipe section; a pull plate for bearing against the annular second end face of the old pipe section; a cylindrical plug for expanding the passageway extending between the pits; a rod member for extending through the bore of the new pipe section to be installed; and a second pull plate for bearing against the annular second end face of the new pipe. The new pipe section is mounted on the rod member and the string of rods is tripped to the first pit. In the course of tripping or retracting the rod string, the following actions simultaneously occur: the old pipe is advanced out of the passageway by pulling on it with the first pull plate; the old pipe is split longitudinally as it is advanced into the first pit; the diameter of the passageway is expanded by the plug; and the new pipe is pulled into the expanded passageway to replace the old pipe with the new pipe.

13 Claims, 7 Drawing Sheets

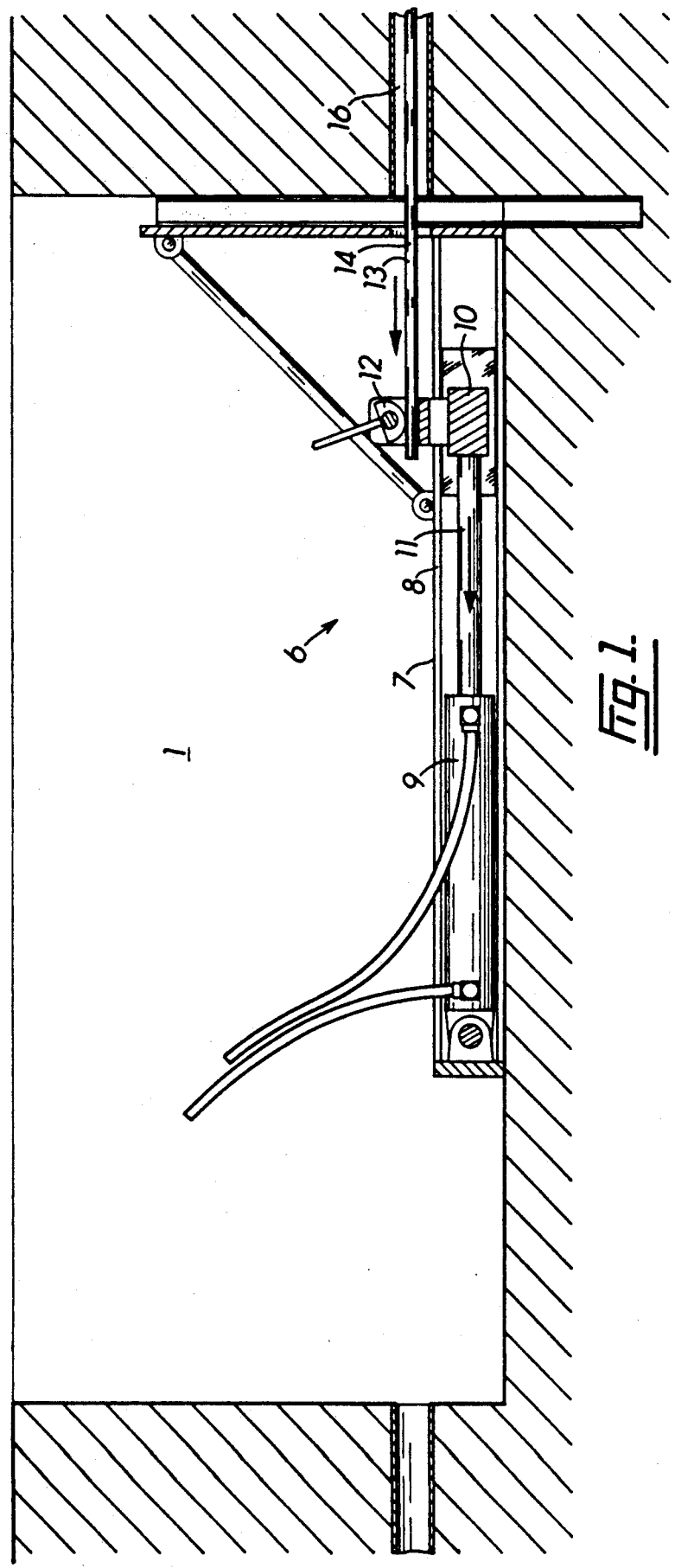

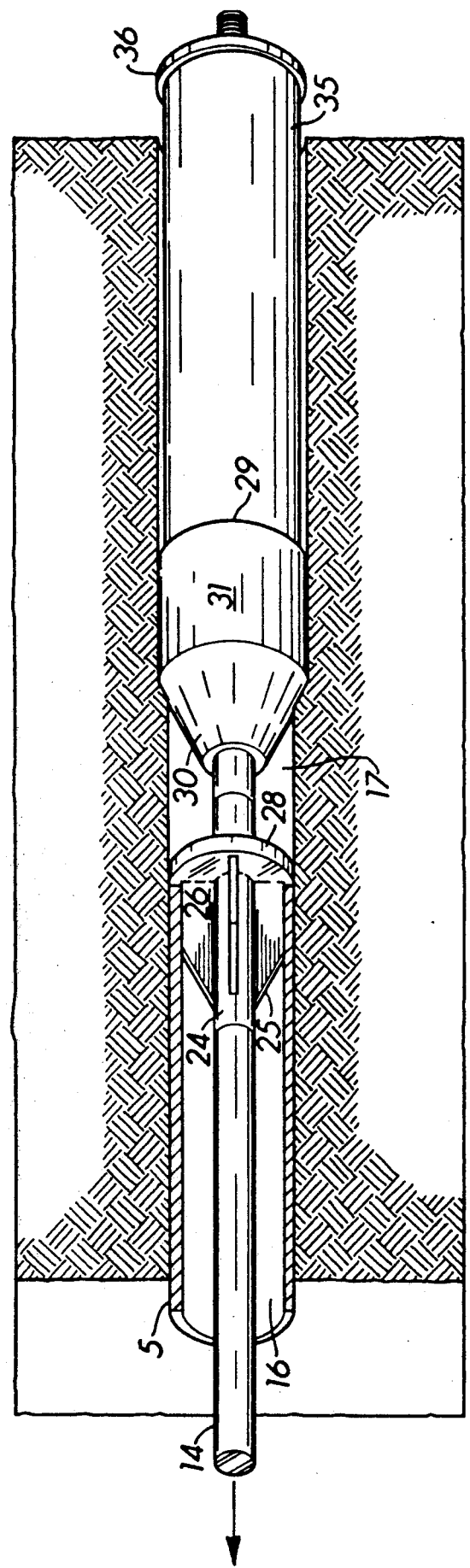

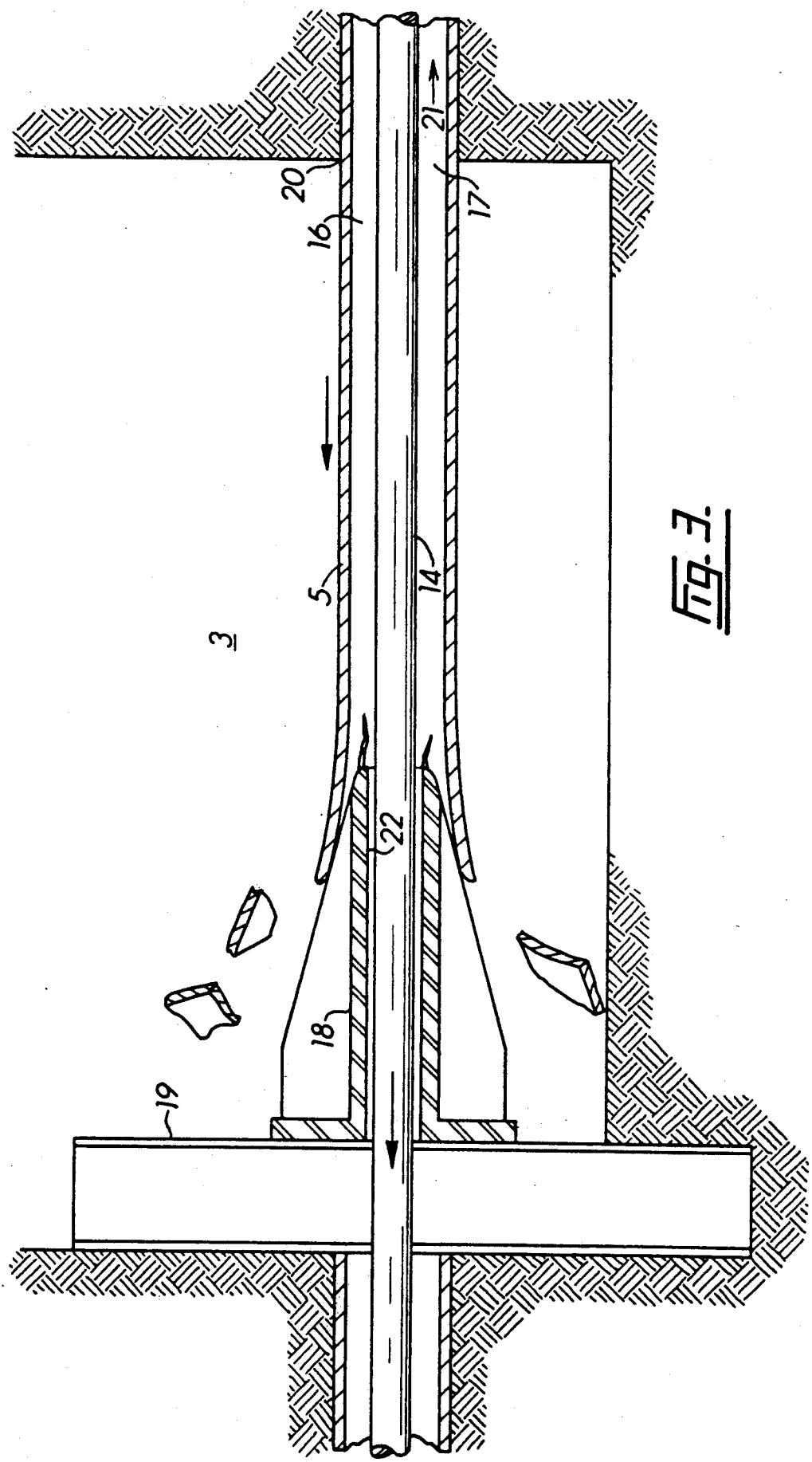

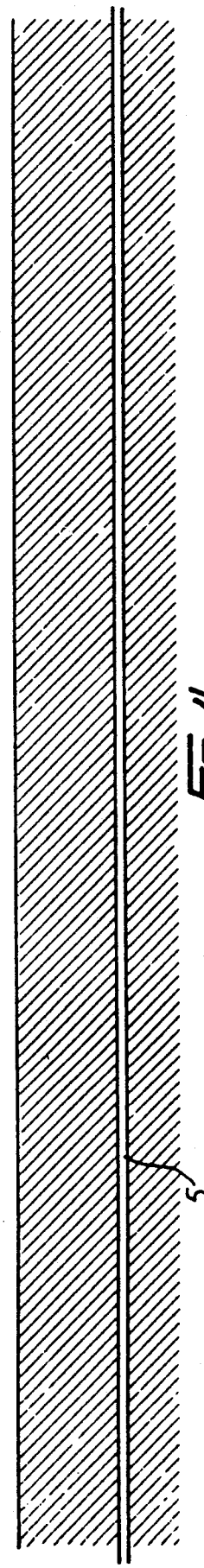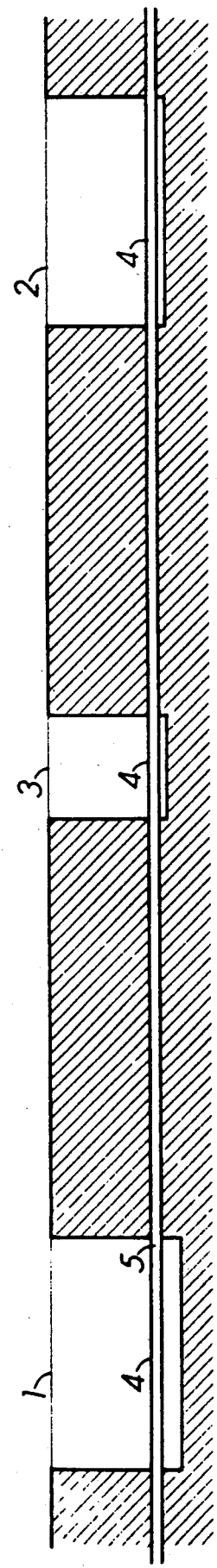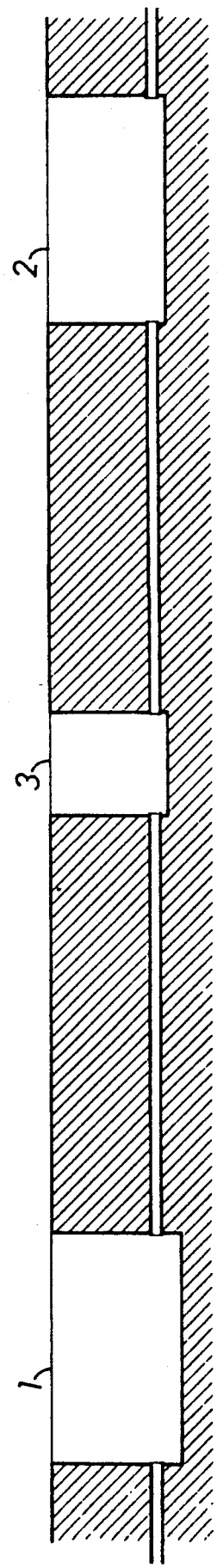
Fig. 4a.
Fig. 4b.
Fig. 4c.

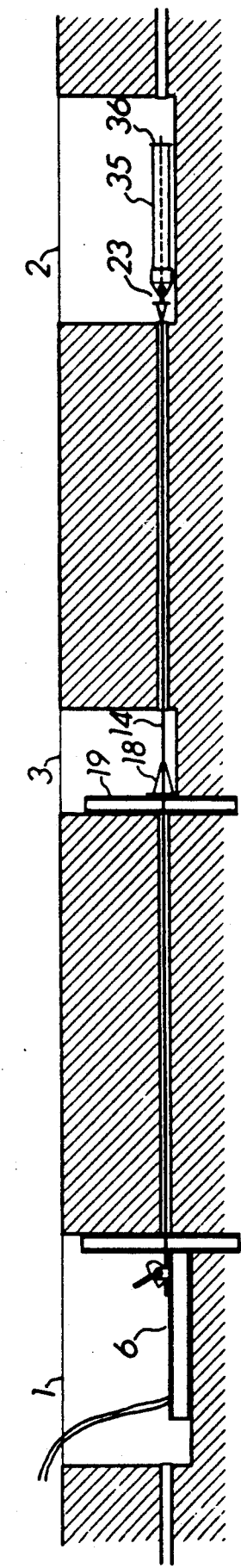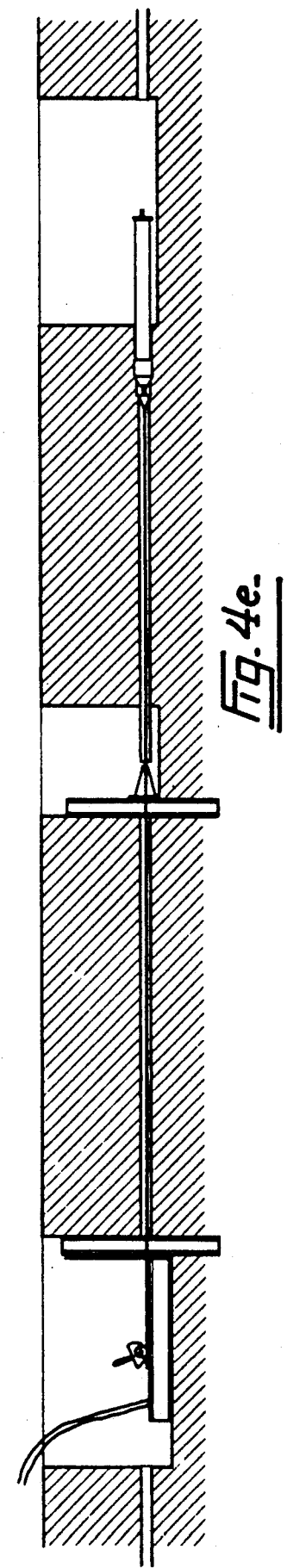

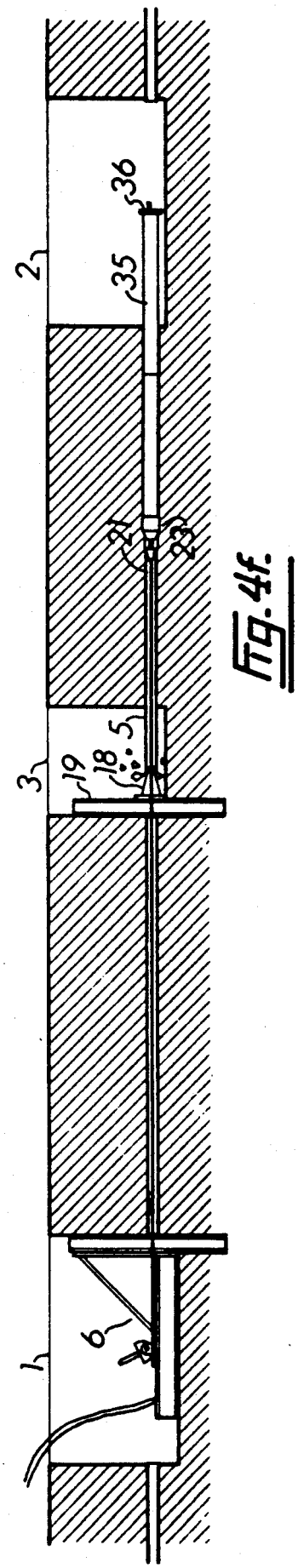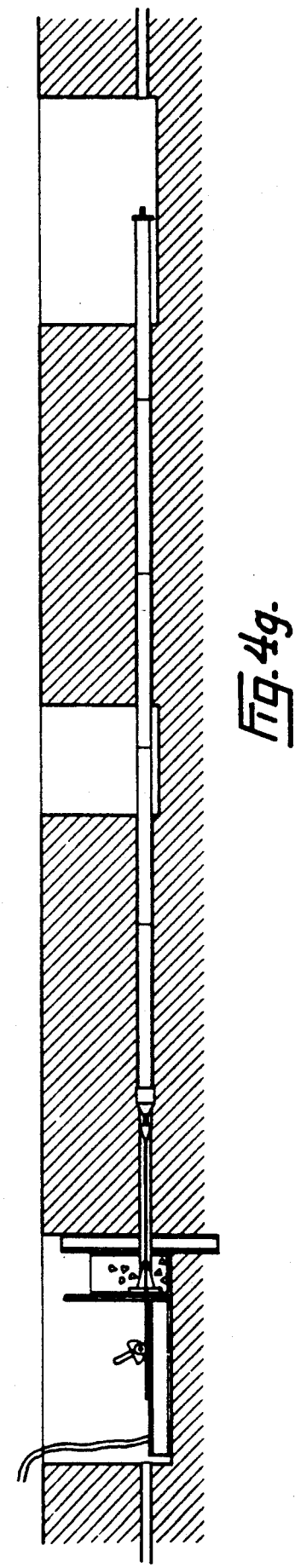

PROCESS FOR REPLACING A LENGTH OF BURIED PIPE

FIELD OF THE INVENTION

The present invention relates to an apparatus and process for removing a long section of buried old pipe and replacing it with new pipe, without excavating the section along its full length.

BACKGROUND OF THE INVENTION

It is known to remove and replace a section of buried old pipe, such as a cast iron water main, using a "trenchless" procedure involving:

Digging pits at each end of the pipe section, to expose the pipe at those points;

Breaking up and removing the exposed segments of old pipe, to thereby clear the pits;

Installing a skid-mounted, rod string-tripping machine in the first pit, which machine is adapted to feed and withdraw a string of rods horizontally. The machine typically has one or more double-acting cylinders mounted in a frame for extension and contraction in a horizontal plane, together with means for releasably clamping onto the rod string, so that the cylinder rods and rod string may move longitudinally as a unit in the course of a cylinder stroke;

Forming a string of rods (which have threaded pin and box couplings at their ends) having a radially expandable toothed dog assembly at its end and feeding it part way through the pipe section;

Expanding the dog assembly to engage it with the old pipe;

Actuating the rod string-tripping machine to advance the engaged portion of the old pipe section into the first pit in short lengths. Each such length of old pipe extending into the pit is then severed radially. The severed length of old pipe is removed. This process, of tripping the rod string with dog assembly in and out, to engage and remove sequential, discrete parts of the old pipe section, is continued until the entire pipe section has been removed;

Threading the rod string back through the now pipe-free passageway, from the first pit to the second pit;

Attaching an expander (that is, a cylindrical plug) to the second end of the rod string and pulling it back through the passageway, to increase its diameter;

Removing the expander at the first pit and again threading the rod string back through the expanded passageway to the second pit; and Pulling the section of new pipe into the expanded passageway from the second pit using the rod string, to complete the replacement.

Such a system is disclosed in U.S. Pat. No. 4,626,134, issued to Coumont.

The described system has some shortcomings. It involves repeated trips with the rod string through the old pipe bore and the passageway formed by the pipe in the soil. And it further involves fracturing the old pipe, that has been advanced into the first pit, along a vertical plane using a guillotine-type means, to yield a discrete short length of pipe, and then presumably manually breaking up and removing this length. This latter operation interrupts the continuity of the process and unites with the multiplicity of trips to stretch out the tim ® needed to complete the replacement.

It is the objective of the present invention to provide an improved trenchless system whereby old pipe is replaced with new pipe in a single trip of the rod string.

SUMMARY OF THE INVENTION

The present invention is a variation of the previously described conventional system in which:

first and second pits are dug at each end of a buried section of old pipe which is to be replaced;

a cylinder-type rod string-tripping machine is emplaced in the first pit; and the machine is used to extend and withdraw a string of rods horizontally, as required, to accomplish the steps of pulling the old pipe into the first pit for break-up and removal, expanding the old passageway and pulling new pipe into the expanded passageway from the second pit.

For purposes of definition, the word "trip" is intended to encompass either of forming and extending or withdrawing and disassembling a string of rods. The phrase "round trip" covers the sum of forming, extending, withdrawing and disassembling a string of rods.

In one aspect, the invention is directed toward a pipe replacement process that involves using only a single round trip of the rod string and preferably incorporates simultaneously splitting the old pipe longitudinally, using mechanical means, in the course of advancing the old pipe into the pit. In another aspect, the invention comprises the assembly of components used to carry out the process More particularly, in the equipment aspect there is provided a novel combination of components, assembled and ready for use to simultaneously expel the old pipe, split it longitudinally, expand the passageway and emplace new pipe in the expanded passageway. The assembly of components preferably includes:

A string-tripping machine positioned in the first pit, with at least part of the exposed old pipe having been broken out beforehand so that the machine has access to the bore of the buried section of pipe, so as to extend its rod string thereinto;

A string of rods extending from the string-tripping machine through the bore of the old pipe to a second pit where at least part of the old pipe exposed at that pit has also been broken out;

Means for mechanically breaking up the old pipe as the latter is expelled. Said means are located in the pit into which the old pipe is being advanced. More preferably, the means comprises a stationary, hollow, conical member having its small end positioned adjacent the outlet from the old pipe passageway, so that old pipe being advanced will move over the small end of the conical member and the pipe will be split longitudinally and broken up as it continues to pass along the length of the conical member, said conical member forming a central passage therethrough for accommodating the rod string;

A tool assembly attached to the second end of the rod string at the second pit. The tool assembly comprises a unit of sequentially connected components. More particularly, it comprises: means for centralizing the axis of the terminal end of the rod string in the bore of the old pipe; means for bearing against the annular second end face of the old pipe, so as to drive the old pipe ahead of it when pulled on; means for expanding the passageway which originally contained the old pipe; and means for engaging the new pipe to pull it into the expanded passageway behind the old pipe as the latter is expelled. More preferably, the centralizing means comprises a guide member adapted to fit snugly in the old pipe and the second means comprises a circular pull plate attached thereto. The guide member functions to centralize the pull plate so that it will bear evenly against the full extent of the annular second end face of the old pipe. Attached to the pull plate is the third means, for expanding the passageway as it passes therethrough. More preferably, the third means comprises a short cylinder or plug having an outside diameter that is slightly larger than that of the passageway through which the old pipe extends. The fourth means, for engaging the new pipe, may preferably comprise means for attaching to the front end of the new pipe or a rod and pull plate assembly that extends through the bore of the new pipe and bears against the annular surface of its rear end; and as a final integer, the string of new pipe to be emplaced in the expanded passageway.

In the process aspect, the invention comprises:

excavating first and second pits at the first and second ends of the section of old pipe to be removed and replaced, to thereby expose the pipe at those points;

breaking up the two segments of exposed pipe, to clear the pits;

inserting, in the first pit, first means for horizontally tripping a rod string;

inserting, in the first pit, means for longitudinally splitting old pipe being advanced thereover, said second means being adapted to enable a rod string to extend therethrough;

tripping a string of rods through the bore of the old pipe section;

attaching, to the second end of the rod string, a tool assembly comprising, in sequence, second means for bearing against the annular second end face of the old pipe section, third means, secured to the second means, for expanding the diameter of the passageway as said third means passes therethrough, and fourth means, secured to the third means, for engaging new pipe to pull it into the expanded passageway, said fourth means having a section of new pipe associated therewith; and pulling on the first end of the rod string with the first means and progressively disassembling the rods as they become available in the first pit, thereby advancing the old pipe into the first pit and over the splitter means, whereby the pipe is split longitudinally, while simultaneously pulling the tool assembly through the old passageway to expand it and bring the new pipe into the expanded passageway until the section of old pipe has been replaced with new pipe.

DESCRIPTION OF THE DRAWINGS

FIG. 1 is a partly sectional, simplified side view of the rod-tripping machine positioned in the first pit;

FIG. 2 is a partly broken away side view showing the tool assembly simultaneously expelling old pipe, expanding the passageway, and pulling in new pipe to replace the old pipe;

FIG. 3 is a sectional side view at an intermediate third pit with the splitter functioning to longitudinally split old pipe being advanced into the pit;

FIGS. 4a–4g are side views showing the steps involved in replacing pipe in accordance with a three pit version of the invention.

DESCRIPTION OF THE PREFERRED EMBODIMENT

Figure 5:
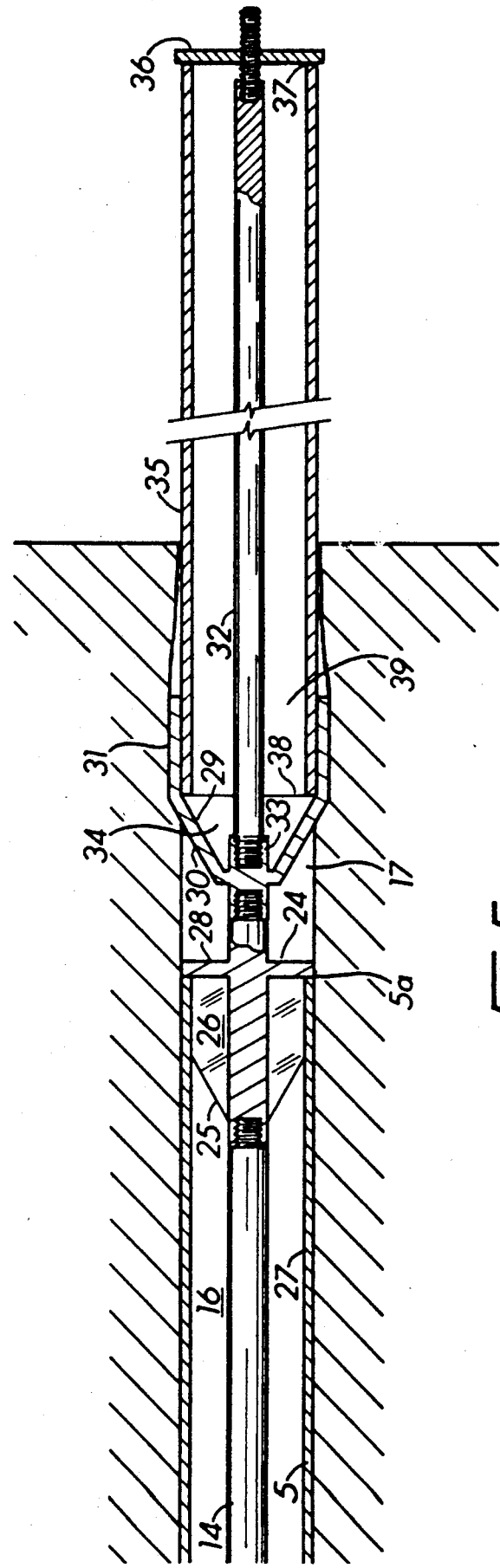
FIG. 5 is a sectional side view showing the expander, its connection with the second rod string, and the second rod string extending through the new pipe section to the second pull plate.

A specific embodiment of the invention will now be described in conjunction with using first and second end pits 1,2 and a third intermediate pit 3 for the replacement process. Typically the pipe being replaced has a diameter of 4 to 12 inches and the pits are spaced apart about 40 to 500 feet.

The pits are dug to expose the end segments 4 of an old pipe section 5 that is to be replaced.

The exposed pipe segments 4 are broken up, typically with sledgehammers or the like, and the pieces are removed to clear the pits.

A rod-tripping machine 6 is inserted into the first pit 1. The machine 6 comprises a frame 7 having a pair of parallel, spaced apart I-beams 8. A pair of parallel, horizontally extending, hydraulically actuated, double-acting cylinders 9 are mounted in the I-beams 8. A block 10 extends transversely between the I-beams 8 and is attached to the outer ends of the cylinder rods 11. The I-beams 8 function to guide the block 10 in the course of reciprocating, sliding travel. The block 10 carries a pivotally mounted clamp member 12. The clamp member 12 is operative to releasably lock the last rod 13 of the rod string 14 to the block 10. The frame 7 of the machine abuts vertically extending piles 15, so that it cannot shift forwardly when pulling on the rod string 14.

The rod string 14 is formed of short steel rods 13 having threaded pin and box ends.

In the course of tripping the rod string 14 into the bore 16 of the old pipe section 5 or into the passageway 17, a rod 13 is manually screwed into the first end of the string 14. The clamp member 12 is tightened to secure the end rod 13 to the block 10. The cylinders 9 may then be extended to advance the rod string 14 one stroke length into the bore 16 or passageway 17, as the case may be. Similarly, in tripping the rod string 14 out of the bore 16 or passageway 17, the clamp member 12 is clamped onto the last rod 13 of the string 14 with the cylinders 9 in the extended position. The cylinders 9 are then contracted to pull on the rod string 14 and withdraw it through a travel of one stroke length. The last rod 13 may then be unscrewed manually and removed. In this conventional fashion, the rod string 14 can be made up rod by rod and tripped in or it can be disassembled rod by rod and tripped out. In conjunction with tripping, the power of the cylinders 9 is available to apply a powerful pushing or pulling force to the rod string 14, as required.

A splitter 18 is positioned in the intermediate pit 3. The splitter 18 is mounted on vertical piles 19 and is aligned axially with the passageway 17. As shown, the splitter 18 is conical in form and has its small end directed toward the outlet 20 of that portion 21 of the passageway 17 which extends between the third and second pits 3,2. The splitter 18 forms a central axial opening 22 for the passage therethrough of the rod string 14.

In operation, as the old pipe 5a is advanced out of the passageway portion 21 into the pit 3, it passes over the splitter 18, as shown in FIG. 3, and is split longitudinally and broken up.

Having reference to FIG. 2, a tool assembly 23 is provided for attachment to the second end of the rod string 14, once the string has extended into the second end pit 2.

More particularly, the tool assembly 23 comprises a centralizer 24, adapted to screw onto the end of the rod string 14. The centralizer 24 has a tapered section 25 at its forward end and a cylindrical section 26 at its rear end. The cylindrical section 26 is dimensioned to closely fit the inside surface 27 of the old pipe 5a.

A vertically extending, circular pull plate 28 is threaded onto the rear end of the centralizer 24. The pull plate 28 is equal in diameter to the outside diameter of the old pipe 5. When centered, the pull plate 28 is adapted to bear evenly against the annular second end face 29 of the old pipe section 5. By obtaining even distribution of pulling pressure around the full extent of the end face 29, the likelihood is minimized that the pipe 5a will buckle when pulled toward the first pit 1.

An expander 29 is threaded onto the rear end of the pull plate 28. The expander 29 has a forwardly positioned, conical section 30 and a rearwardly positioned, cylindrical section 31. The cylindrical section 31 has an outer diameter slightly greater than the diameter of the original passageway 17. The rear end of the cylindrical section 31 is open.

A second rod member or string 32, having threaded ends, is screwed into a coupling 33 attached to the inner end 34 of the expander 29. The coupling 33 is co-axial with the expander 29, so that the second rod string 32 is aligned with the centralized rod string 14. The rod string 32 extends through the section 35 of new pipe. A second circular pull plate 36 is threaded onto the rear end of the second rod string 32 and bears against the annular end face 37 of the new pipe section 34. The second pull plate 36 is threaded along the second rod string 32 a sufficient distance so as to bring the front opening 38 of the new pipe section 35 into the open-ended cavity 39 formed by the expander cylindrical section 31. The opening 38 is therefore protected from the entry of soil.

Having reference now to FIGS. 4a-4g inclusive, the pits 1, 2, 3 are excavated to expose the pipe segments 4. The pipe segments 4 are broken up and removed. The rod-tripping machine 6 is then inserted into the first end pit 1 and the splitter 18 is positioned in the intermediate pit 3. The rod string 14 is tripped by the machine 6 through the bore 16 of the old pipe section 5 until its second end enters the second end pit 2. Part of the tool assembly 23, comprising the sequentially connected centralized first pull plate 28, expander 29, and second rod string 32 are then attached to the rod string 14. The new pipe section 35 is threaded onto the second rod string 32. The second pull plate is threaded up behind the end face 37 of the new pipe section 35, to advance the pipe opening 38 into the shielding enclosure of the expander 29. At this stage, the rod string 14 is ready to be tripped from the second end pit 2 to the intermediate pit 3. As the rod string 14 is progressively withdrawn and disassembled at the first pit 1, the old pipe 5a in passageway portion 21 is advanced into pit 3 and broken . up on splitter 18 while simultaneously the passageway portion 21 is expanded by expander 29 passing therethrough and new pipe 35a is pulled into the expanded passageway 21. Once new pipe 35a has been emplaced in passageway portion 21, the splitter 18 is moved to the first pit and the procedure repeated to remove the balance of the old pipe and replace it with new pipe in one trip.

Various alternatives to the system described will readily suggest themselves. For example, instead of using a conical splitter to break up the advancing old pipe, one could use a hydraulically actuated assembly acting from the side to crush the old pipe. Instead of using a rod and pull plate assembly to engage the new pipe, one can fuse a plastic nose to the forward end of the new pipe and attach it to the rod string 14 with means such as a clevis assembly.

The scope of the invention is defined by the claims now following.

THE EMBODIMENTS OF THE INVENTION IN WHICH AN EXCLUSIVE PROPERTY OR PRIVILEGE IS CLAIMED ARE DEFINED AS FOLLOWS:

1. In a method for replacing a buried section of old pipe which extends through a passageway formed in the soil, wherein first and second pits are provided at each end of the section to expose segments of the old pipe, and wherein these segments are sufficiently removed to make accessible the bore of the old pipe section, and wherein a string of rods having first and second ends is tripped from the first pit to the second pit through t he bore, the improvement comprising:
   (a) attaching to the second end of the rod string a tool assembly comprising, in sequence, second means for bearing against the adjacent annular second end face of the old pipe section, third means for expanding the diameter of the passageway, and fourth means for engaging and pulling new pipe into the expanded passageway behind the old pipe as the latter is pulled toward the first pit, said fourth means having a section of new pipe associated therewith;
   (b) providing means for breaking up the old pipe in the course of its advance out of the old passageway; and
   (c) tripping the rod string, thereby simultaneously advancing the old pipe out of the old passageway, breaking up the old pipe as it leaves the passageway, expanding the diameter of the passageway, and advancing the new pipe into the expanded passageway to replace old pipe with new pipe.

2. A method for replacing a buried section of old pipe, which extends through a passageway formed in the soil, with a corresponding section of new pipe, comprising:
   (a) excavating first and second open pits at the first and second ends of the pipe section, to thereby expose the pipe at those points;
   (b) breaking up at least part of the exposed segments in each of the pits;
   (c) inserting, in the first pit, first means for tripping a rod string;
   (d) inserting, in the first pit, means for longitudinally splitting old pipe being advanced thereover as said pipe enters the pit, said splitting means being adapted to enable the rod string to pass therethrough;
   (e) tripping a string of rods from the first pit to the second pit through the bore of the old pipe section, said string extending through the splitting means;

(f) attaching to the second end of the rod string a tool assembly comprising, in sequence, second means for bearing against the annular second end face of the old pipe section, third means for expanding the diameter of the passageway, and fourth means for engaging and pulling new pipe into the expanded passageway behind the old pipe as the latter is pulled toward the first pit, said fourth means having a section of new pipe associated therewith;

(g) tripping the rod string through the passageway, thereby simultaneously advancing the old pipe out of the passageway and into the first pit, longitudinally splitting the old pipe as it reaches the first pit, expanding the diameter of the passageway, and advancing the new pipe into the expanded passageway to replace the old pipe with the new pipe.

3. A method for replacing part of a buried section of old pipe, which extends through a passageway formed in the soil, with a corresponding section of new pipe, comprising:

(a) excavating first, second and third open pits at the first and second ends of the section and at a point between its ends, respectively, to thereby expose the pipe at those points;

(b) breaking up at least part of the exposed segments of old pipe in each of the pits;

(c) inserting, in the first pit, first means for tripping a rod string;

(d) inserting, in the third pit, means for longitudinally splitting old pipe being advanced thereover as said pipe enters the pit, said splitting means being adapted to enable the rod string to pass therethrough;

(e) tripping a string of rods from the first pit to the second pit through the bore of the old pipe section, said string extending through the splitting means;

(f) attaching to the second end of the rod string a tool assembly comprising, in sequence, second means for bearing against the annular second end face of the old pipe section, third means for expanding the diameter of the passageway, and four means for pulling new pipe into the expanded passageway behind the old pipe a the latter is pulled toward the first pit, said fourth means having a section of new pipe associated therewith;

(g) tripping the rod string from the second pit to the third pit, thereby simultaneously advancing the old pipe out of the passageway and into the third pit, longitudinally splitting the old pipe as it reaches the third pit, expanding the diameter of the passageway between the second and third pits, and advancing the new pipe into the expanded passageway to replace old pipe with new pipe.

4. The method as set forth in claim 2 wherein the tool assembly comprises means, positioned between the second end of the first rod string and the second means, for centralizing the second end of the first rod string in the second end of the old pipe section.

5. The method as set forth in claim 3 wherein the tool assembly comprises means, positioned between the second end of the first rod string and the second means, for centralizing the second end of the first rod string in the second end of the old pipe section.

6. Apparatus for replacing a section of buried old pipe extending between first and second pits from each of which at least part of the segment of exposed old pipe has been removed to make accessible the bore of the old pipe section, comprising:

first means, positioned in the first pit, for tripping a rod string in a generally horizontal plane;

a first rod string extending through the bore of the old pipe section and into the second pit;

means, located in the first pit, for breaking up old pipe as it is advanced into the first pit;

a section of new pipe positioned at the second pit; and a tool assembly attached to the second end of the rod string, said tool assembly comprising a string of sequentially connected components, said components comprising second means for bearing against the annular second end face of the old pipe, third means for expanding the old pipe passageway as said means passes therethrough, and means for engaging and pulling the new pipe into the expanded passageway behind the old pipe.

7. The apparatus as set forth in claim 6 comprising:
means, positioned between the second end of the first rod string and the second means, for centralizing the second end of the first rod string in the second end of the old pipe section.

8. The apparatus as set forth in claim 6 wherein the breaking up means comprises a conical member adapted to longitudinally split the old pipe as it advances thereover, said conical member forming a central bore for enabling the rod string to extend therethrough.

9. The apparatus as sets forth in claim 7 wherein the breaking up means comprises a conical member adapted to longitudinally split the old pipe as it advances thereof, said conical member forming a central bore for enabling the rod string to extend therethrough.

10. Apparatus for replacing a section of buried old pipe extending between first, second and third pits, said third pit being positioned between the others and the exposed segments of pipe having been substantially removed to clear the pits and make accessible the bore of the old pipe section, comprising:

first means, positioned in the first pit, for tripping a rod string in a generally horizontal plane;

a first rod string extending through the bore of the old pipe section and into the second pit;

means, located in the third pit, for breaking up old pipe as it is advanced thereover into the third pit;

a section of new pipe positioned at the second pit; and a tool assembly attached to the second end of the rod string, said tool assembly comprising a string of sequentially connected components, said components comprising second means for bearing against the annular second end face of the old pipe, third means for expanding the old pipe passageway as said means passes therethrough, and means for engaging and pulling the new pipe into the expanded passageway behind the old pipe.

11. The apparatus as set forth in claim 10 wherein the breaking up means comprises a conical member adapted to longitudinally split the old pipe as it advances thereover, said conical member forming a central bore for enabling the rod string to extend therethrough.

12. The apparatus as set forth in claim 10 comprising:
means, positioned between the second end of the first rod string and the second means, for centralizing the second end of the first rod string in the second end of the old pipe section.

13. The apparatus as set forth in claim 12 wherein the breaking up means comprises a conical member adapted to longitudinally split the old pipe as it advances thereover, said conical member forming a central bore for enabling the rod string to extend therethrough.

* * * * *